(12) United States Patent
Lin et al.

(10) Patent No.: US 11,726,234 B2
(45) Date of Patent: Aug. 15, 2023

(54) OPTICAL DEVICE

(71) Applicant: VisEra Technologies Company Limited, Hsin-Chu (TW)

(72) Inventors: Kuo-Feng Lin, Kaohsiung (TW); Chin-Chuan Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 562 days.

(21) Appl. No.: 16/865,692

(22) Filed: May 4, 2020

(65) Prior Publication Data

US 2021/0341648 A1     Nov. 4, 2021

(51) Int. Cl.
*G02B 1/00*   (2006.01)
*G02B 1/14*   (2015.01)
*G02B 3/08*   (2006.01)
*G02B 3/00*   (2006.01)

(52) U.S. Cl.
CPC ............... *G02B 1/002* (2013.01); *G02B 1/14* (2015.01); *G02B 3/08* (2013.01); *G02B 3/0006* (2013.01); *G02B 2003/0093* (2013.01)

(58) Field of Classification Search
CPC ............ C03B 19/1423; C03B 2207/62; C03B 2207/66; C03B 2207/70; G02B 1/002; G02B 1/14; G02B 2003/0093; G02B 3/0006; G02B 3/08
See application file for complete search history.

(56) References Cited

U.S. PATENT DOCUMENTS

2012/0002285 A1   1/2012  Matsuda
2018/0231702 A1   8/2018  Lin et al.
2019/0033683 A1   1/2019  Ahmed et al.
2019/0137665 A1*  5/2019  You ................... G02B 1/002
2019/0361334 A1  11/2019  Xing et al.

FOREIGN PATENT DOCUMENTS

| CN | 107315206 A | 11/2017 |
| CN | 109324466 A | 2/2019 |
| CN | 109557666 A | 4/2019 |
| TW | 201723677 A | 7/2017 |
| TW | I653442 B | 3/2019 |
| TW | 201931021 A | 8/2019 |
| WO | WO-2018204856 A1 | 11/2018 |

OTHER PUBLICATIONS

Office Action dated May 27, 2022 in CN Application No. 202110274605.X, 7 pages.

* cited by examiner

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

An optical device includes a first region and a second region surrounding the first region. The optical device includes a substrate. The optical device also includes a first meta-structure disposed on the substrate and has a plurality of first peripheral pillars in the second region. The optical device further includes a second meta-structure disposed on the substrate and has a plurality of second peripheral pillars corresponding to the plurality of first peripheral pillars. Each of the second peripheral pillars has a first shifting distance with respect to a corresponding first peripheral pillar in the direction extending from the center of the optical device to the edge of the optical device.

17 Claims, 5 Drawing Sheets

OPTICAL DEVICE

BACKGROUND

Technical Field

Embodiments of the present disclosure relate to an optical device, and in particular they relate to an optical device that includes at least two meta-structures.

Description of the Related Art

Generally, conventional optical lenses, such as color filters, light-focusing lenses, and beam splitters, have to be combined together to provide specific functionality. Moreover, in order to eliminate the chromatic effect (which degrades their performance in full-color imaging applications), designers have to integrate several lenses with opposite dispersion together. These conventional optical lenses may make the final device using them bulky.

In recent years, a thin lens with focusing effect, which is called meta-lens, has been developed. The meta-lens has nano-structures using high refractive index materials to change optical phase. This structure greatly improves the volume and weight of conventional optical lenses.

However, existing meta-lenses have not been satisfactory in every respect.

SUMMARY

Since general meta-lens structures have finite unit cells with constant (or fixed) pitch sizes, which may cause truncated phase diagram, resulting in poor light-collecting efficiency or image distortion.

According to the embodiments of the present disclosure, an optical device that includes at least two meta-structures is provided. In some embodiments, at least one of the meta-structures is offset relative to the other meta-structures, such that the light-collecting efficiency may be enhanced, and the possibility of image distortion may be effectively reduced.

Some embodiments of the present disclosure include an optical device having a first region and a second region surrounding the first region. The optical device includes a substrate. The optical device also includes a first meta-structure disposed on the substrate and having a plurality of first peripheral pillars in the second region. The optical device further includes a second meta-structure disposed on the substrate and having a plurality of second peripheral pillars corresponding to the plurality of first peripheral pillars. Each of the second peripheral pillars has a first shifting distance with respect to a corresponding first peripheral pillar in the radiation direction from the center of the optical device to the edge of the optical device.

BRIEF DESCRIPTION OF THE DRAWINGS

Aspects of the embodiments of the present disclosure can be understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
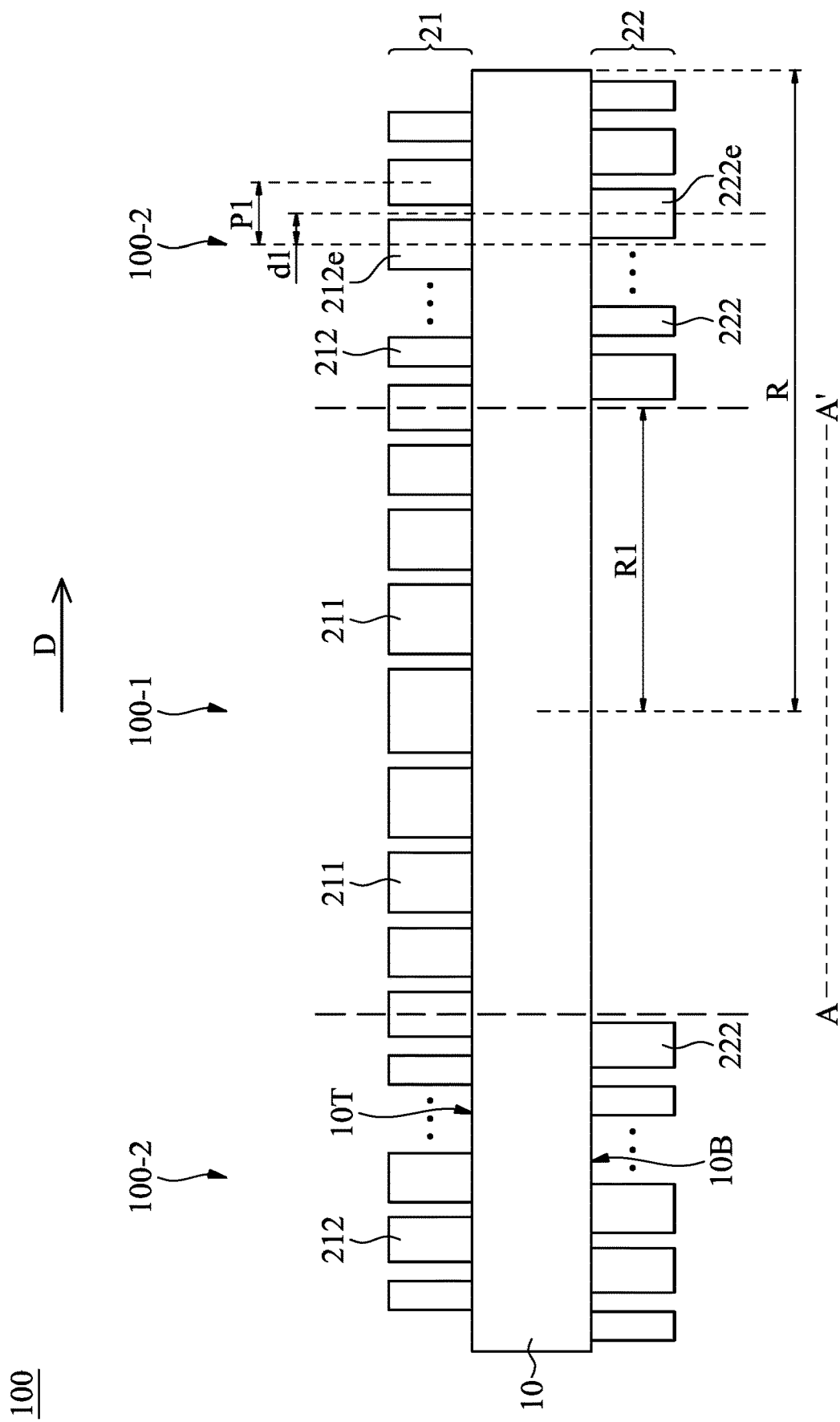
FIG. 1 is a partial cross-sectional view illustrating an optical device according to an embodiment of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

FIG. 1 is a partial cross-sectional view illustrating an optical device 100 according to an embodiment of the present disclosure. It should be noted that some components may be omitted in FIG. 1, for the sake of brevity.

As shown in FIG. 1, the optical device 100 may be divided into a first region 100-1 and a second region 100-2, and the second region 100-2 may surround the first region 100-1. In some embodiments, the top view of the optical device 100 may be circular having radius R (i.e., the center of the optical device 100 to the edge of the optical device 100 is R), and the distance R1 between the center of the first region 100-1 and the edge of the first region 100-1 may be ⅓ of radius R of the optical device 100. For example, the distance R1 may be between about 4 μm and about 250 μm, but the present disclosure is not limited thereto.

Referring to FIG. 1, the optical device 100 includes a substrate 10 having a first surface 10T and a second surface 10B opposite the first surface 10T. In some embodiments, the material of the substrate 10 may include silicon oxide ($SiO_2$), polymers that have the refractive index about 1.5 (e.g., polymethylmethacrylate (PMMA), polydimethylsiloxane (PDMS), polymethylpentene (PMP)), or a combination thereof, but the present disclosure is not limited thereto. In some embodiments, the substrate 10 may be a semiconductor-on-insulator (SOI) substrate.

Referring to FIG. 1, the optical device 100 includes a first meta-structure 21 disposed on the substrate 10. In more detail, the first meta-structure 21 may be disposed on the first surface 10T of the substrate 10 and have a plurality of first central pillars 211 in the first region 100-1 and first peripheral pillars 212 (212e) in the second region 100-2. In some embodiments, the material of the first central pillar 211 and the material of the first peripheral pillar 212 (212e) may include single crystal silicon, polycrystalline silicon (poly Si), amorphous silicon, $Si_3N_4$, GaP, $TiO_2$, AlSb, AlAs, AlGaAs, AlGaInP, BP, $ZnGeP_2$, any other applicable material, or a combination thereof, but the present disclosure is not limited thereto.

In some embodiment, the top surfaces of the first central pillars 211 and the first peripheral pillars 212 (212e) may have circular shapes, and the diameters of the circular shapes may vary. For example, the diameters of the circular shapes may vary from about 0.15 μm to about 0.30 μm, but the present disclosure is not limited thereto. Moreover, the heights of the first central pillars 211 and the first peripheral pillars 212 (212e) may be about 0.5 μm, but the present disclosure is not limited thereto. The shapes and sizes of the first central pillars 211 and the first peripheral pillars 212 (212e) may be adjusted depending on need.

Referring to FIG. 1, the optical device 100 includes a second meta-structure 22 disposed on the substrate 10. In more detail, the second meta-structure 22 may be disposed on the second surface 10B of the substrate 10 and have a plurality of second peripheral pillars 222 (222e). In this embodiment, the second peripheral pillars 222 (222e) are disposed in the second region 100-2. In some embodiments, the material of the second peripheral pillar 222 may be similar to or the same as the material of the first central pillar 211 and the material of the first peripheral pillar 212 (212e), and details are not described herein again.

As shown in FIG. 1, the first peripheral pillars 212 (212e) may correspond to the second peripheral pillars 222 (222e) in the second region 100-2. Moreover, each of the second peripheral pillars 222 (e.g., second peripheral pillar 222e) may have a first shifting distance d1 with respect to the corresponding first peripheral pillar 212 (e.g., first peripheral pillar 212e) in the radiation direction D from the center of the optical device 100 to the edge of the optical device 100.

In some embodiments, two adjacent first peripheral pillars 212 (or two adjacent first central pillars 211) may have a first pitch P1, and the first shifting distance d1 may be more than 0 and less than the first pitch P1 (i.e., 0<d1<P1). For example, the first shifting distance d1 may be P1/2, but the present disclosure is not limited thereto.

That is, the second meta-structure 22 may be offset relative to the first meta-structure 21 in the second region 100-2 of the optical device 100 according to the embodiments of the present disclosure.

As shown in FIG. 1, in the cross-sectional view of the optical device 100 along line A-A', which is parallel with the radiation direction D, there may be at least eight first central pillars 211 in the first region 100-1 of the optical device 100. For example, there may be thirty-two, twenty, sixteen, etc., first central pillars 211 in the first region 100-1 of the optical device 100, but the present disclosure is not limited thereto.

Generally, when light is emitted into the conventional optical device, phase truncation may be occurs in the region away from the center of the conventional optical device, resulting in poor light-collecting efficiency or image distortion. Since the second meta-structure 22 may be offset relative to the first meta-structure 21 in the second region 100-2 (i.e., the region away from the center) of the optical device 100 according to the embodiments of the present disclosure, phase truncation may be prevented, such that the light-collecting efficiency may be enhanced, and the possibility of image distortion may be effectively reduced.

In some embodiments, light may enter the optical device 100 from the second meta-structure 22 and emit from the first meta-structure 21, but the present disclosure is not limited thereto. Moreover, in the embodiment shown in FIG. 1, the second meta-structure 22 has no pillar in the first region 100-1 of the optical device 100, but the present disclosure is not limited thereto.

Figure 2:
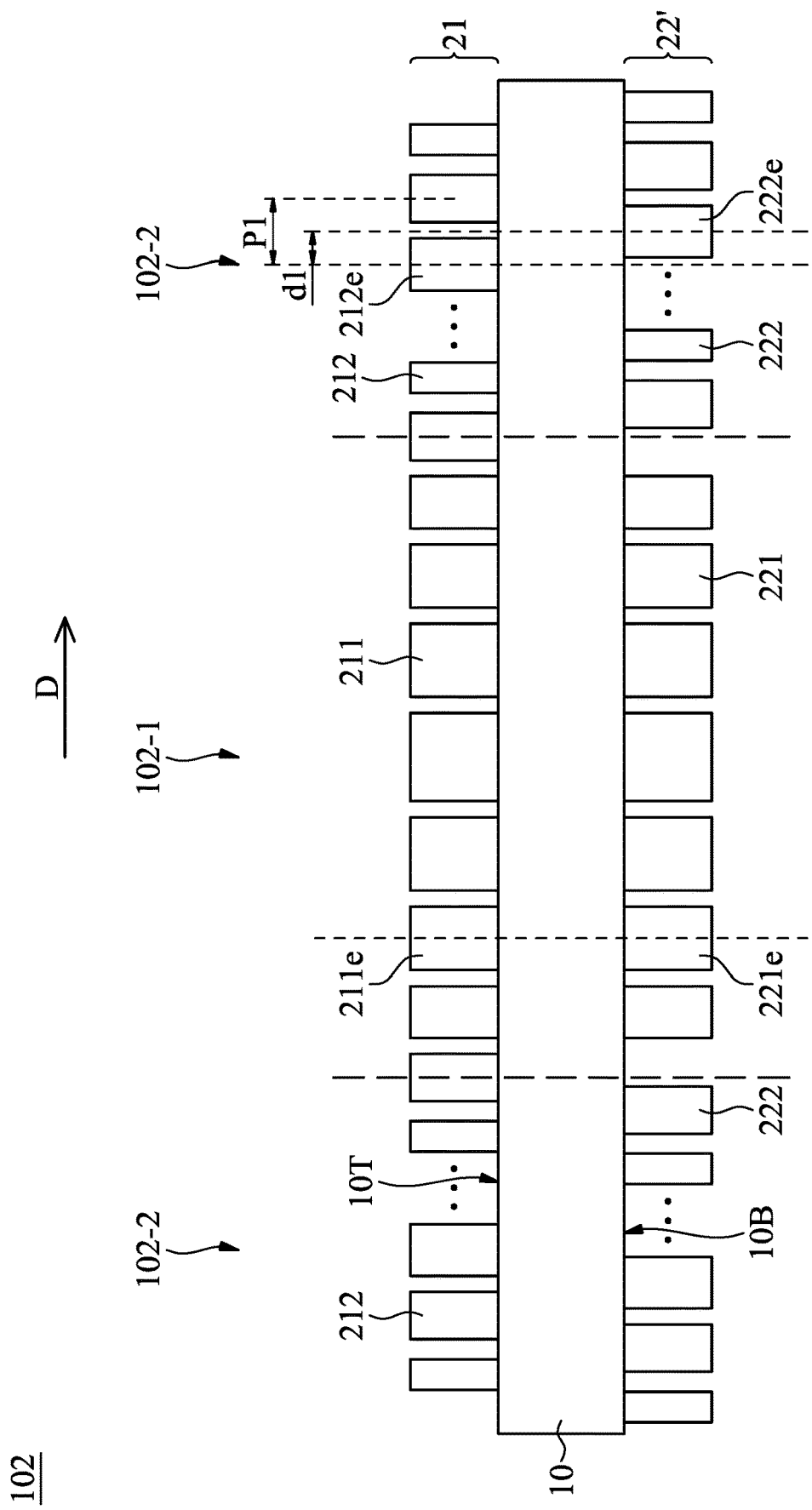
FIG. 2 is a partial cross-sectional view illustrating an optical device according to another embodiment of the present disclosure.

FIG. 2 is a partial cross-sectional view illustrating an optical device 102 according to another embodiment of the present disclosure. It should be noted that some components may be omitted in FIG. 2, for the sake of brevity.

Referring to FIG. 2, the optical device 102 includes a substrate 10 having a first surface 10T and a second surface 10B opposite the first surface 10T. The optical device 102 also includes a first meta-structure 21 disposed on the first surface 10T of the substrate 10, and the first meta-structure 21 has a plurality of first central pillars 211 (211e) in the first region 102-1 and first peripheral pillars 212 (212e) in the second region 102-2. The optical device 102 further includes a second meta-structure 22' disposed on the second surface 10B of the substrate 10, and the second meta-structure 22' has a plurality of second peripheral pillars 222 (222e) in the second region 102-2.

The difference from the optical device 100 shown in FIG. 1 is that the second meta-structure 22' of the optical device 102 may further have a plurality of second central pillars 221 (221e) in the first region 102-1.

As shown in FIG. 2, in some embodiments, the second central pillars 221 (221e) may correspond to the first central pillars 211 (211e) in the first region 102-1. Moreover, each of the second central pillars 221 (e.g., second central pillar 221e) may be aligned with the corresponding first central pillar 211 (e.g., first central pillar 211e) in the first region 102-1.

Similarly, in the second region 102-2, each of the second peripheral pillar 222s (e.g., second peripheral pillar 222e) may have a first shifting distance d1 with respect to the corresponding first peripheral pillar 212 (e.g., first peripheral pillar 212e) in the radiation direction D. Moreover, as shown in FIG. 2, two adjacent first peripheral pillars 212 (or first peripheral pillars 211) may have a first pitch P1, and the first shifting distance d1 may be more than 0 and less than the first pitch P1 (i.e., 0<d1<P1). For example, the first shifting distance d1 may be P1/2, but the present disclosure is not limited thereto.

Figure 3:
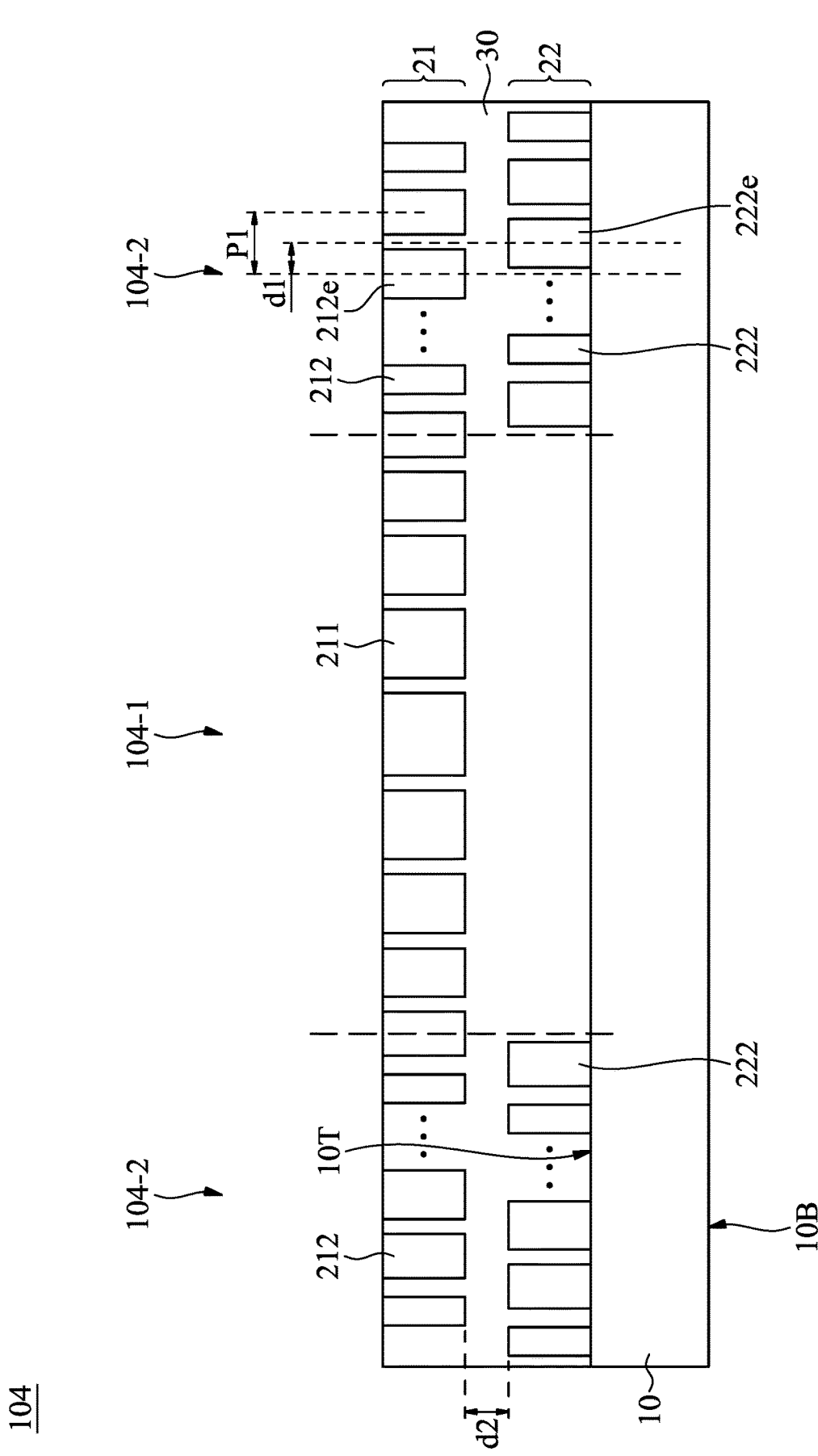
FIG. 3 is a partial cross-sectional view illustrating an optical device according to another embodiment of the present disclosure.

FIG. 3 is a partial cross-sectional view illustrating an optical device 104 according to another embodiment of the present disclosure. It should be noted that some components may be omitted in FIG. 3, for the sake of brevity.

Referring to FIG. 3, the optical device 104 includes a substrate 10 having a first surface 10T and a second surface 10B opposite the first surface 10T. The optical device 104 also includes a first meta-structure 21 disposed on the first surface 10T of the substrate 10, and the first meta-structure 21 has a plurality of first central pillars 211 (211e) in the first region 104-1 and first peripheral pillars 212 (212e) in the second region 104-2. The optical device 104 further includes a second meta-structure 22 disposed on the substrate 10, and the second meta-structure 22 has a plurality of second peripheral pillars 222 (222e) in the second region 104-2.

The difference from the optical device 100 shown in FIG. 1 is that the second meta-structure 22 of the optical device 104 may be also disposed on the first surface 10T of the substrate 10. That is, the first meta-structure 21 and the second meta-structure 22 of the optical device 104 may be disposed on the same side of the substrate 10. In the embodiment shown in FIG. 3, the second meta-structure 22 is disposed between the substrate 10 and the first meta-structure 21, but the present disclosure is not limited thereto.

As shown in FIG. 3, the optical device 104 may further include a protective layer 30 disposed between the first meta-structure 21 and the second meta-structure 22. In more detail, the protective layer 30 may be disposed between the first central pillars 211 and between the first peripheral pillars 212 (212e) of the first meta-structure 21, and the protective layer 30 may also be disposed between the second peripheral 222 pillars (222e) of the second meta-structure 22, but the present disclosure is not limited thereto.

In some embodiments, the refractive index of the first central pillar 211 and the first peripheral pillar 212 (212e) of the first meta-structure 21 (or the refractive index of the second peripheral pillars 222 (222e) of the second meta-structure 22) may be between about 1.8 and about 5.2 (e.g., 1.8), and the difference between the refractive index of the protective layer 30 and the refractive index of the first peripheral pillar 212 (212e) (or the first central pillar 211) of the first meta-structure 21 (or the refractive index of the second peripheral pillars 222 (222e) of the second meta-structure 22) may be more than 0.3 and less than 5.0.

In some embodiments, the refractive index of the protective layer 30 may be less than the refractive index of the first peripheral pillar 212 (212e) (or the first central pillar 211) of the first meta-structure 21 (or the refractive index of the second peripheral pillars 222 (222e) of the second meta-structure 22). For example, the refractive index of the protective layer 30 may be between about 1.2 and about 1.7, and the material of the protective layer 30 may include organic materials (e.g., PMMA, PDMS, PMP), $SiO_2$, MgO, $Al_2O_3$, $GeO_2$, BeO, any other applicable material, or a combination thereof, but the present disclosure is not limited thereto.

In some embodiments, the refractive index of the protective layer 30 may be greater than the refractive index of the first peripheral pillar 212 (212e) (or the first central pillar 211) of the first meta-structure 21 (or the refractive index of the second peripheral pillars 222 (222e) of the second meta-structure 22). For example, the refractive index of the protective layer 30 may be between about 2.0 and about 5.2, and the material of the protective layer 30 may include SiN, $TiO_2$, SiH, GaN, $HfO_2$, GaP, InP, GaSe, PbTe, PbSe, any other applicable material, or a combination thereof, but the present disclosure is not limited thereto.

In some embodiments, light to be emitted into the optical device 104 may have a wavelength of λ, and the distance d2 between the first meta-structure 21 and the second meta-structure 22 may be more than the wavelength λ of the light and less than 20 times the wavelength λ of the light (i.e., λ<d2<20λ), but the present disclosure is not limited thereto.

Similarly, in the second region 104-2, each of the second peripheral pillars 222 (e.g., second peripheral pillar 222e) may have a first shifting distance d1 with respect to the corresponding first peripheral pillar 212 (e.g., first peripheral pillar 212e) in the radiation direction D. Moreover, as shown in FIG. 3, two adjacent first peripheral pillars 212 (or first peripheral pillars 211) may have a first pitch P1, and the first shifting distance d1 may be more than 0 and less than the first pitch P1 (i.e., 0<d1<P1). For example, the first shifting distance d1 may be P1/2, but the present disclosure is not limited thereto. In the embodiment shown in FIG. 3, the second meta-structure 22 has no pillar in the first region 104-1 of the optical device 104, but the present disclosure is not limited thereto.

In some other embodiments, the second meta-structure 22 of the optical device 104 may also have the second central pillars (not shown). Moreover, each of the second central pillars may be aligned with the corresponding first central pillar 211 in the first region 104-1.

Figure 4:
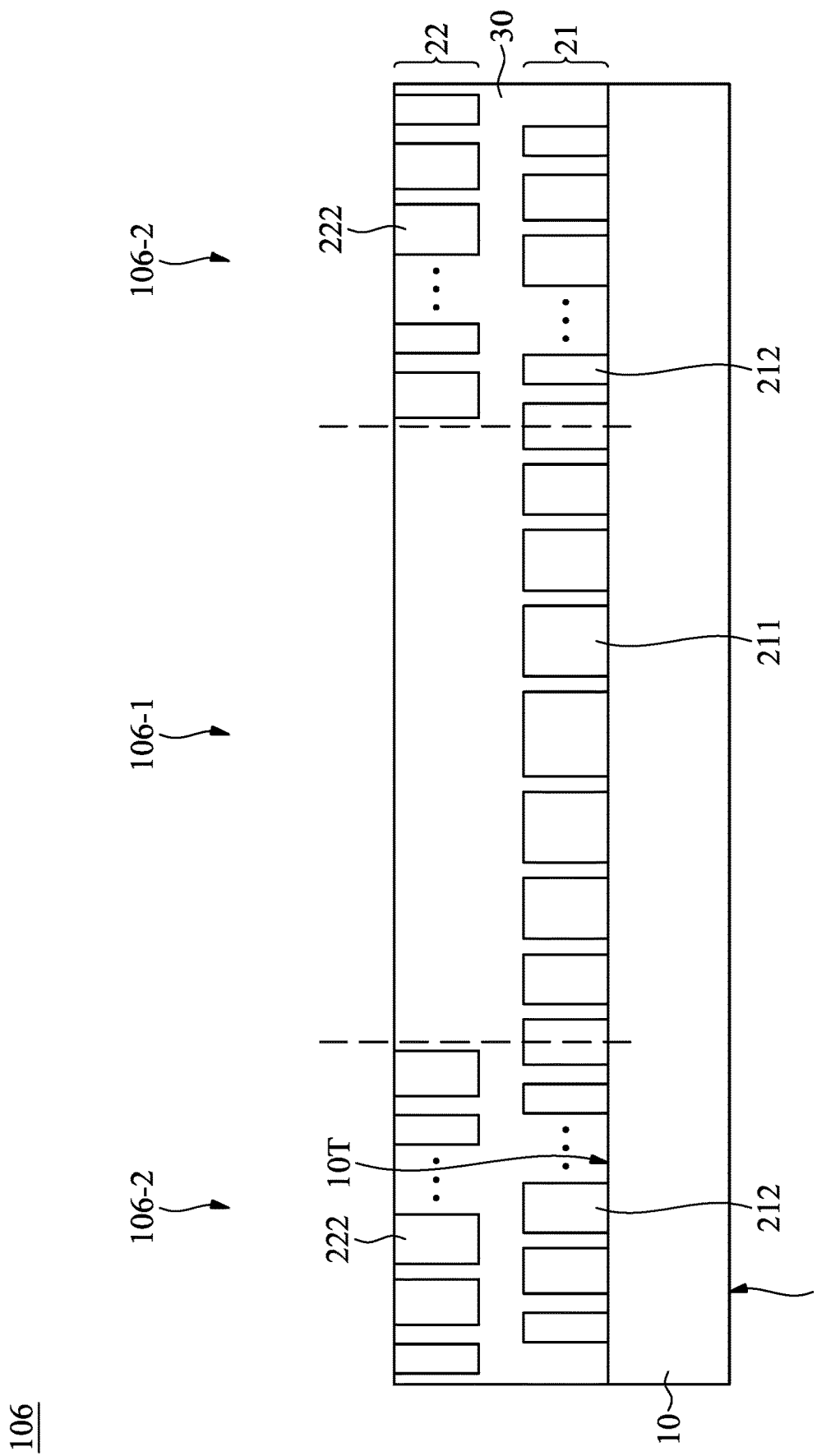
FIG. 4 is a partial cross-sectional view illustrating an optical device according to another embodiment of the present disclosure.

FIG. 4 is a partial cross-sectional view illustrating an optical device 106 according to another embodiment of the present disclosure. It should be noted that some components may be omitted in FIG. 4, for the sake of brevity.

Referring to FIG. 4, the optical device 106 includes a substrate 10. The optical device 106 also includes a first meta-structure 21 disposed on the substrate 10 and the first meta-structure 21 has a plurality of first central pillars 211 in the first region 106-1 and a plurality of first peripheral pillars 212 in the second region 106-2. The optical device 106 further includes a second meta-structure 22 disposed on the substrate 10, and the second meta-structure 22 has a plurality of second peripheral pillars 222 in the second region 106-2.

The difference from the optical device 104 shown in FIG. 3 is that the first meta-structure 21 of the optical device 106 is disposed between the substrate 10 and the second meta-structure 22, and other similarities are not described herein again.

Figure 5:
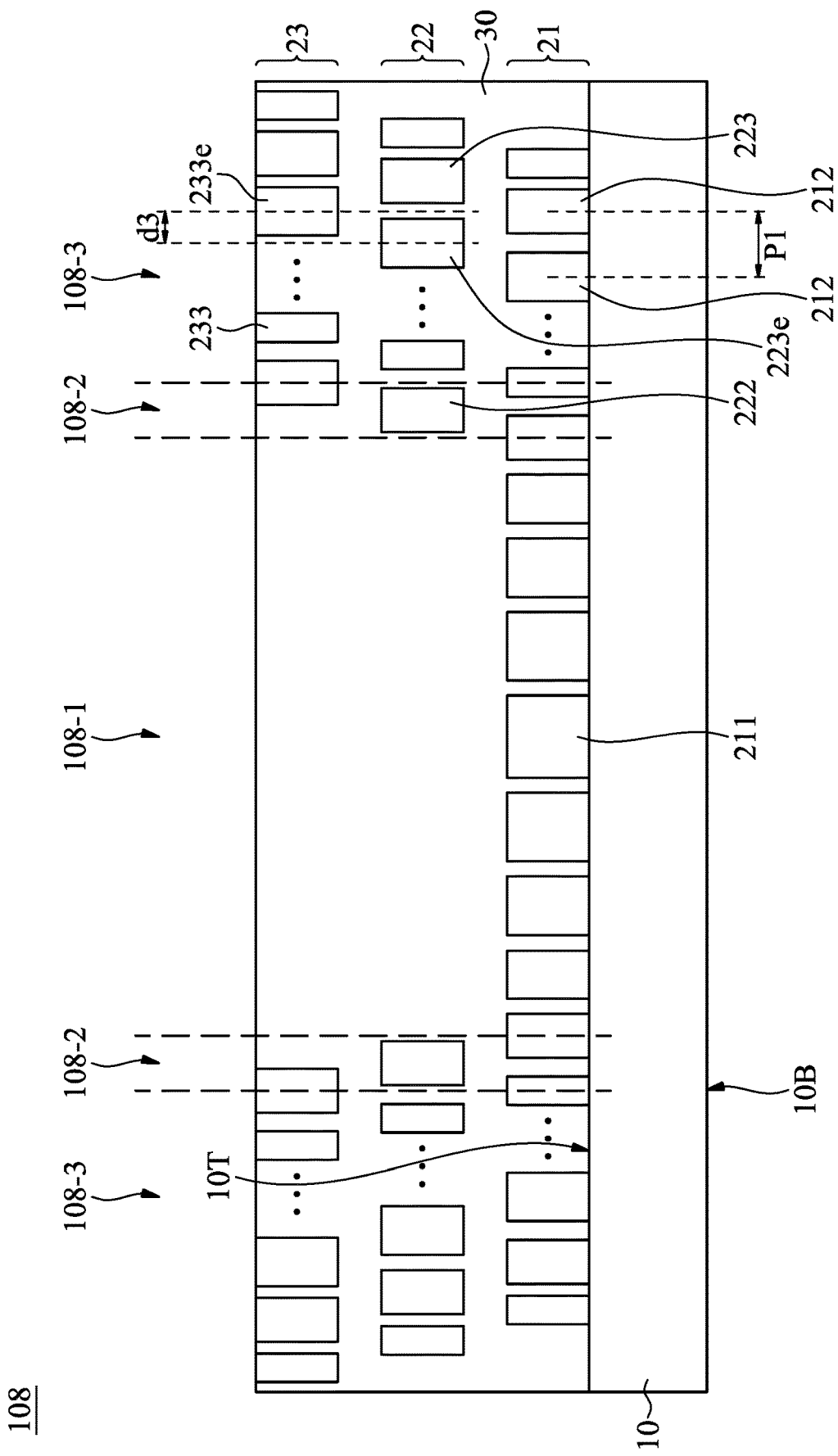
FIG. 5 is a partial cross-sectional view illustrating an optical device according to another embodiment of the present disclosure.

FIG. 5 is a partial cross-sectional view illustrating an optical device 108 according to another embodiment of the present disclosure. It should be noted that some components may be omitted in FIG. 5, for the sake of brevity.

Referring to FIG. 5, the differences from the optical device 104 shown in FIG. 3 are that the optical device 108 may be divided into a first region 108-1, a second region 108-2 surrounding the first region 108-1, and a third region 108-3 surrounding the second region 108-2, the optical device 108 may further include a third meta-structure 23 disposed on the substrate 10, and the third meta-structure 23 has a plurality of third peripheral pillars 233 (233e) in the third region 108-3.

Similarly, the optical device 108 may include a first meta-structure 21 disposed on the substrate 10, and the first meta-structure 21 has a plurality of first central pillars 211 in the first region 108-1 and a plurality of first peripheral pillars 212 in the second region 108-2. The optical device 108 may also include a second meta-structure 22 disposed on the substrate 10, and the second meta-structure 22 has a plurality of second peripheral pillars 222 in the second region 108-2 Moreover, the first peripheral pillars 212 of the first meta-structure 21 may further be disposed in the third region 108-3, and the second peripheral pillars 223 (223e) of the second meta-structure 22 may further be disposed in the third region 108-3.

As shown in FIG. 5, the first meta-structure 21 is disposed between the substrate 10 and the second meta-structure 22, and the second meta-structure 22 is disposed between the first meta-structure 21 and the third meta-structure 23, but the present disclosure is not limited thereto.

Similarly, in the second region 102-2 (and the third region 102-3), each of the second peripheral pillars 222 (223, 223e) may have a first shifting distance with respect to the corresponding first peripheral pillar 212 in the radiation direction D.

In this embodiment, in the third region 108-3, each of the third peripheral pillars 233 (e.g., third peripheral pillar 223e) may have a second shifting distance d3 with respect to the corresponding second peripheral pillar 223 (e.g., second peripheral pillars 223e) in the radiation direction D. Moreover, as shown in FIG. 5, two adjacent first peripheral pillars 212 (or first central pillars) 211 may have a first pitch P1, and the second shifting distance d3 may be more than 0 and less than the first pitch P1 (i.e., $0<d3<P1$). For example, the second shifting distance d3 may be P1/3, but the present disclosure is not limited thereto.

That is, the second meta-structure 22 may be offset relative to the first meta-structure 21 in the second region 108-2 and the third region 108-3 of the optical device 108, and the third meta-structure 23 may be offset relative to the second meta-structure 22 in the third region 108-3 of the optical device 108 according to the embodiments of the present disclosure.

As shown in FIG. 5, the optical device 108 may further include a protective layer 30 disposed between the first meta-structure 21 and the second meta-structure 22 and between the second meta-structure 22 and the third meta-structure 23. In more detail, the protective layer 30 may be disposed between the first central pillars 211 and the first peripheral pillars 212 of the first meta-structure 21, between the second peripheral pillars 222 (223, 223e) of the second meta-structure 22 and between the third peripheral pillars 233 (233e) of the third meta-structure 23, but the present disclosure is not limited thereto.

Furthermore, light to be emitted into the optical device 108 may have a wavelength of λ, and the distance between the first meta-structure 21 and the second meta-structure 22 (or the distance between the second meta-structure 22 and the third meta-structure 23) may be more than the wavelength λ of the light and less than 20λ, but the present disclosure is not limited thereto.

In summary, since the optical device according to the embodiments of the present disclosure may include at least one of the meta-structures that is offset relative to the other meta-structures in the region away from the center of the optical device, phase truncation may be prevented, such that the light-collecting efficiency may be enhanced, and the possibility of image distortion may be effectively reduced.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. An optical device having a first region and a second region surrounding the first region, comprising:
 a substrate;
 a first meta-structure disposed on the substrate and having a plurality of first peripheral pillars in the second region; and
 a second meta-structure disposed on the substrate and having a plurality of second peripheral pillars corresponding to the plurality of first peripheral pillars;
 wherein each of the plurality of second peripheral pillars has a first shifting distance with respect to a corresponding one of the plurality of first peripheral pillars in a direction extending from a center of the optical device to an edge of the optical device;
 wherein the second meta-structure is disposed on the first meta-structure or between the substrate and the first meta-structure,
 the optical device further comprises:
 a protective layer disposed between the first meta-structure and the second meta-structure,
 wherein the protective layer is disposed between the plurality of first peripheral pillars and between the plurality of second peripheral pillars, wherein light to be emitted into the optical device has a wavelength, and a distance between the first meta-structure and the second meta-structure is more than the wavelength of the light and less than 20 times the wavelength of the light.

2. The optical device as claimed in claim 1, wherein the substrate has a first surface and a second surface opposite the first surface, the first meta-structure is disposed on the first surface, and the second meta-structure is disposed on the first meta-structure or on the second surface.

3. The optical device as claimed in claim 1, wherein two adjacent first peripheral pillars have a first pitch, and the first shifting distance is more than 0 and less than the first pitch.

4. The optical device as claimed in claim 1, wherein the first meta-structure further has a plurality of first central pillars in the first region, and in a cross-sectional view of the optical device along a line parallel with the direction extending from the center of the optical device to the edge of the optical device, a number of the plurality of first central pillars is at least eight.

5. The optical device as claimed in claim 4, wherein a distance between a center of the first region and an edge of the first region is between 4 µm and 250 µm.

6. The optical device as claimed in claim 4, wherein the second meta-structure has no pillar in the first region.

7. The optical device as claimed in claim 4, wherein the second meta-structure further has a plurality of second central pillars in the first region.

8. The optical device as claimed in claim 7, wherein the plurality of second central pillars correspond to the plurality of first central pillars, and each of the plurality of second central pillars is aligned with a corresponding one of the plurality of first central pillars.

9. The optical device as claimed in claim 1, wherein a difference between a refractive index of the protective layer and a refractive index of each of the plurality of first peripheral pillars is more than 0.3 and less than 5.0.

10. The optical device as claimed in claim 9, wherein the refractive index of the protective layer is less than the refractive index of each of the plurality of first peripheral pillars.

11. The optical device as claimed in claim 10, wherein a material of the protective layer comprises PMMA, PDMS, PMP, $SiO_2$, MgO, $Al_2O_3$, $GeO_2$, or BeO.

12. The optical device as claimed in claim 9, wherein the refractive index of the protective layer is greater than the refractive index of each of the plurality of first peripheral pillars.

13. The optical device as claimed in claim 12, wherein a material of the protective layer comprises SiN, $TiO_2$, SiH, GaN, $HfO_2$, GaP, InP, GaSe, PbTe, or PbSe.

14. The optical device as claimed in claim 1, wherein the optical device further has a third region surrounding the second region, and the optical device further comprises:
a third meta-structure disposed on the substrate and having a plurality of third peripheral pillars corresponding to the plurality of second peripheral pillars in the third region;
wherein each of the plurality of third peripheral pillars has a second shifting distance with respect to a corresponding one of the plurality of second peripheral pillars in the direction extending from the center of the optical device to the edge of the optical device.

15. The optical device as claimed in claim 14, wherein two adjacent first peripheral pillars have a first pitch, and the second shifting distance is more than 0 and less than the first pitch.

16. The optical device as claimed in claim 14, wherein the first meta-structure is disposed between the substrate and the second meta-structure, and the second meta-structure is disposed between the first meta-structure and the third meta-structure.

17. The optical device as claimed in claim 16, further comprising:
a protective layer disposed between the first meta-structure and the second meta-structure, and between the second meta-structure and the third meta-structure.

* * * * *